J. G. PETTIS.
OXO-ACETYLENE WELDING TORCH.
APPLICATION FILED APR. 2, 1914.
1,151,496.
Patented Aug. 24, 1915.
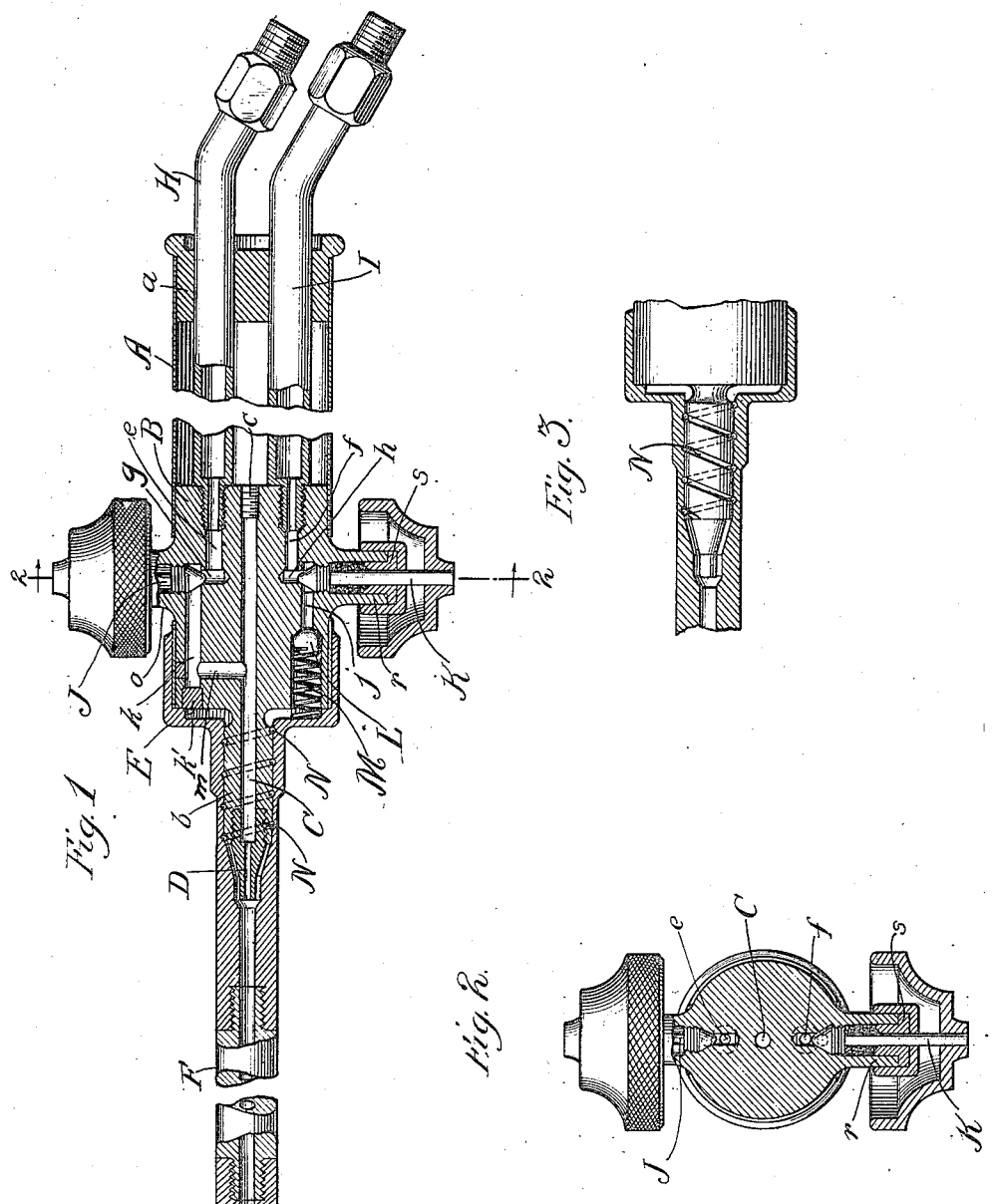
Witnesses:
W. R. Pairson
Florence Mitchell
Inventor:
John G. Pettis
By Frank D. Thomason
Attorney.

UNITED STATES PATENT OFFICE.

JOHN G. PETTIS, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

OXO-ACETYLENE WELDING-TORCH.

1,151,496.  Specification of Letters Patent.  Patented Aug. 24, 1915.

Application filed April 2, 1914. Serial No. 828,984.

*To all whom it may concern:*

Be it known that I, JOHN G. PETTIS, a citizen of the United States, residing at Chicago, in the county of Cook and State of Illinois, have invented new and useful Improvements in Oxo-Acetylene Welding-Torches, of which the following is a full, clear, and exact description.

My invention relates to the class of torches generally known as oxo-acetylene torches, and particularly torches of this character used for welding.

The object of my invention is to provide a simply constructed, easily regulated welding torch in which the gases are thoroughly mixed before reaching the jet, and which by securing an even and perfect commingling of the gases produces practically uniform combustion and absolutely prevents the back-fire pressure from burning the flexible tubes connecting the torch to the sources from which its gaseous supply is obtained, or destroying the flame produced by said gases. This I accomplish by the means hereinafter fully described and as particularly pointed out in the claims.

In the drawings: Figure 1 is a longitudinal section through my improved torch. Fig. 2 is a transverse section taken on dotted line 2—2, Fig. 1. Fig. 3 is a detail view of the spirally grooved extension of the mixing head of the torch.

Referring to the drawings, A represents a cylindrical casing of sufficient length to form a convenient handle and this handle is closed by a suitable plug $a$ at its rear end and by a suitable bushing B at its forward end. This bushing B projects forward beyond the handle A a suitable distance and is provided with an extension $b$ of reduced diameter that extends centrally forward therefrom. This bushing and its extension has an axial bore C extending therethrough, the rear end of which is closed by a suitable screw-threaded plug $c$. and a removable nozzle D has its screw-threaded shank screwed axially into the forward end of said extension $b$. This nozzle is provided with a bore of less diameter in axial alinement with the bore C, and its exterior, contiguous to the forward end of the extension, is tapered for about half its length, and the remainder of the forward portion thereof is, preferably, cylindrical, and is shown to be of a diameter not very much greater than the bore C of the bushing.

The forward end of the bushing and its extension $b$ and the nozzle D are inclosed by a head E, the rear bell-shaped end of which is securely mounted upon the forward end of the bushing in such manner as to make a gas-tight joint. The forward part of this head comprises a stub of reduced diameter, as shown, and the bore of this stub is in gas-tight contact with the outer circumference of extension $b$ of the bushing its entire length. Beyond the forward end of said extension the bore of this stub is funnel-shaped and is parallel to the tapered exterior of the nozzle, and then is parallel to the cylindrical forward portion of said nozzle for the remainder of its length. Just beyond the forward end of the latter the bore of the stub is further reduced to a diameter corresponding to the bore of the bushing, substantially as shown in the drawings. The forward end of the stub of the head is slightly reduced in a diameter and screw-threaded, and one or more pipe extensions F are screwed onto and extend from said stub, and the forward end of the forward most extension is, preferably, bent laterally and has a discharge jet G screwed into the same.

On either side of the center of the rear end of the bushing, preferably the same distance therefrom, it is provided with two longitudinal passages $e$ and $f$. These passages provide ingress for the acetylene and the oxygen gases, respectively. A pipe H is screwed into the rear end of passage $e$, and it extends rearwardly through plug $a$, and at its rear end is suitably constructed to connect with the source from which the acetylene gas is obtained, and a pipe I is screwed into the rear end of passage $f$, and extends, preferably, parallel to pipe H, back through plug $a$, and is suitably connected to the source from which the oxygen gas is procured. These passages $e$ and $f$ extend forward a short distance and their forward ends are intersected by the diametrically opposite lateral bores $g$ and $h$, of the needle-valves J and K, which latter have their inner ends enlarged and pointed so as to control the communication between passages $e$ and $k$, and $f$ and passage $j$. Passages $j$ and $k$ are made by boring longitudinally into the front end of the bushing at points farther from the axis thereof than passages e and f until their rear ends extend past the forward ends of said passages e and f. The front end of passage k is closed by a plug k', and near its forward end it is connected with the bore of the bushing by a radial passage m, the outer end of which latter is closed. The forward portion of passage j, however, is, preferably, increased in diameter and a ball-valve L is placed therein that is continually pressed against the forward end of the rear reduced portion of said passage j by means of a coil-spring M.

The central area of the inner surface of the forward end of the bell of the head E is depressed and forms an annular chamber through which gas flowing out of the forward end of passage j can communicate with a helical passage or passages N surrounding the forward extension of the bushing and extending from the root of said extension to the forward end thereof and discharging into the annular space between the nozzle D and inner circumference of the bore of the forwardly projecting stub of the head where it surrounds the nozzle. If desired, this helical passage N can be made one-half in the bore of the stub of the head and one half in the outer circumference of the extension of the bushing.

The needle-valves extend radially out through short stubs o and r, projecting from the bushing at points diametrically opposite each other, and the outer ends of said needle-valves are provided with suitable knobs with which to turn them, and the shafts of said valves are made gas-tight by suitable gland-nuts s, engaging said stubs o and r, as shown.

In operation, when the pipes H and I are connected to a suitable source of supply, the former to an acetylene gas tank and the latter to an oxygen gas tank, the needle-valves are manipulated to permit the desired quantities of said gases to enter the bushing. The acetylene gas flows through the passage e from thence into passage k and from the latter flows through lateral passage m into the bore of the bushing, and is forcibly ejected from the nozzle D into the bore of the pipe sections leading to the jet, from which latter it is expelled. The oxygen gas enters passage f and from thence into passage j in which latter its pressure forces ball-valve L off of its seat, and flows forward through the wide portion of passage j into the annular chamber at the forward end of the bushing, and from thence into the helical passage N. The oxygen gas expelled from the forward end of this spiral passage maintains its helical course around the head of the nozzle, and at the forward extremity of the nozzle is concentrated inward toward and becomes thoroughly mixed with the acetylene gas, and this mixture continues in a spiral current all the way to the discharge orifice of the jet G by which time it is thoroughly mixed.

The quantity of each gas necessary to produce the proper mixture is controlled by manipulating the needle-valves, and the gaseous mixture forcibly expelled from the jet is regulated to produce a flame the welding properties of which are determined by its color. For some reason unknown to me, all welding torches are subject to back-fire, and heretofore the explosions from this back-fire have been such that they not only extinguish the flame, but extend backward through the torch to the flexible connection of the pipes H and I, which they melt. In my invention, the back-fire roes not extend through the bushing, owing to the presence of the ball-valve in the passage j in the bushing, and owing to the thorough mixture of the two gases into practically one homogeneous mass. This advantage enables the operator to keep steadily at work and prevents the work from becoming cool and the welding more or less faulty by reason of the re-melting after the torch has been relit after the flame has been put out by the back-fire.

What I claim as new is:

1. A torch of the kind specified comprising a suitable casing, and a discharge-pipe extending forward therefrom, means for supplying acetylene gas, means for supplying oxygen, and means which discharge one of said gases in a straight current into the rear end of said discharge-pipe and which conducts the other gas in a spiral course and discharges it in a whirling current into the rear end of said discharge-pipe to commingle with said straight current; said second mentioned means including an element provided with an axial bore forming a passage for one gas and a circumferential groove forming a passage for the other gas.

2. A torch of the kind specified comprising a suitable casing, means for supplying acetylene gas, means for supplying oxygen, a bushing in said casing having an axial bore forming a passage for one of said gases and having a circumferential helical groove forming a gas conducting passage for the other gas, and a discharge-pipe, the rear end portion of which incloses the bushing and into which the two gases are simultaneously discharged in a whirling stream.

3. A torch of the kind specified comprising a suitable casing, a bushing in the same having an extension of reduced diameter extending from the forward end thereof that has an axial bore that extends into said bushing, a forwardly extending discharge-pipe the forward end of which terminates in a suitable discharge jet and the rear end of which incloses said extension, said extension provided with a circumferential helical groove from which and from the bore of said extension two streams of gases simultaneously discharge in a helically whirling stream into and thereby thoroughly mix and commingle in said discharge pipe.

4. A torch of the kind specified comprising a suitable casing, a bushing in the same having an extension of reduced diameter extending from the forward end thereof that has an axial bore that extends into said bushing, a suitable nozzle in which the forward end of said extension terminates and which has a tapering exterior, a forwardly extending discharge-pipe the forward end of which terminates in a suitable discharge jet and the rear end of which has a bore which is parallel to and incloses said extension, said extension provided with a circumferential helical groove from which and from the bore of said extension two streams of gases simultaneously discharge into and commingle in said discharge pipe.

In witness whereof I have hereunto set my hand this 25th day of March, 1914.

JOHN G. PETTIS.

Witnesses:
FRANK D. THOMASON,
FLORENCE MITCHELL.